(Model.)

2 Sheets—Sheet 1.

D. WIGERT.
ANIMAL TRAP.

No. 479,161. Patented July 19, 1892.

Witnesses:
Joseph C. Wigert
McHenry Ruark

Inventor.
David Wigert.

(Model.)

D. WIGERT.
ANIMAL TRAP.

No. 479,161. Patented July 19, 1892.

2 Sheets—Sheet 2.

Witnesses

Harry L. Ames.
H. W. Riley

Inventor
David Wigert.
By his Attorneys,
C. A. Snow & Co.

UNITED STATES PATENT OFFICE.

DAVID WIGERT, OF GREENBUSH, ILLINOIS.

ANIMAL-TRAP.

SPECIFICATION forming part of Letters Patent No. 479,161, dated July 19, 1892.

Application filed September 24, 1891. Serial No. 406,752. (Model.)

*To all whom it may concern:*

Be it known that I, DAVID WIGERT, of Greenbush, in the county of Warren and State of Illinois, have invented an Automatic Rat-Trap, of which the following is a specification.

The invention relates to improvements in animal-traps.

The object of the present invention is to improve the construction of self-set and ever-set animal-traps and to provide one which will be adapted for catching rats and other small animals, and which will be operated by the slightest touch of an animal in attempting to obtain the bait.

The invention consists in the construction and novel combination and arrangement of parts hereinafter fully described, illustrated in the accompanying drawings, and pointed out in the claims hereto appended.

Figure 1:
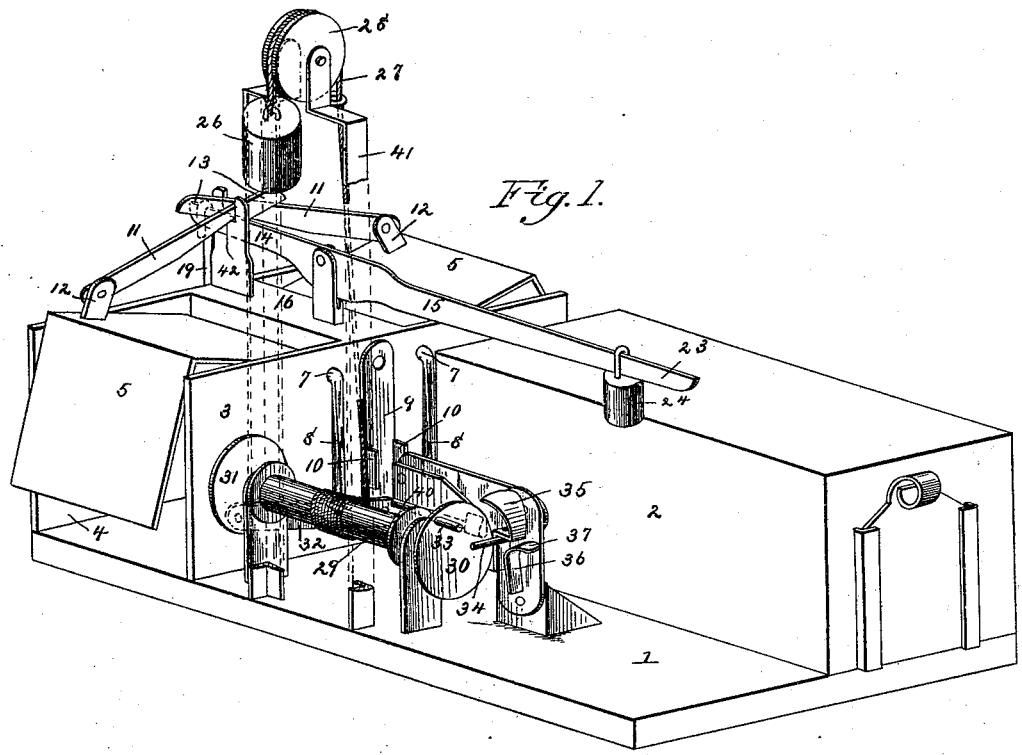
Figure 2:
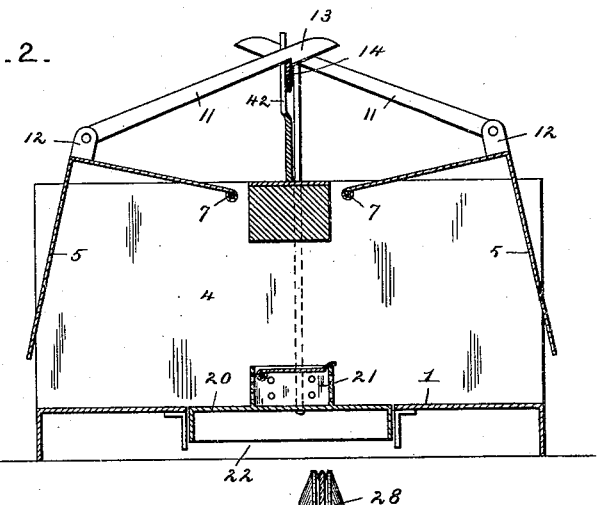
Figure 3:
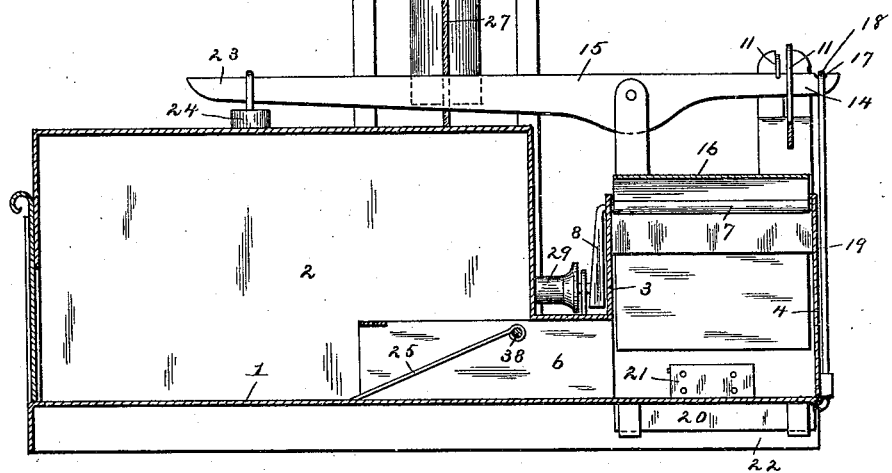

In the drawings, Figure 1 is a perspective view of an animal-trap constructed in accordance with this invention. Fig. 2 is a transverse sectional view. Fig. 3 is a longitudinal sectional view. Fig. 4 is a plan view.

Like numerals of reference indicate corresponding parts in all the figures of the drawings.

1 designates a platform or base, having mounted upon it a cage 2 and provided at one end with transverse partitions 3 and 4, between which are pivoted L-shaped doors 5, which form a bait-compartment, and the latter communicates with the cage by means of a passage-way 6. The L-shaped doors 5 form, when closed, the top and ends of the bait-compartment and are secured to and carried by rock-shafts 7, which are arranged at the ends of the horizontal portions or tops of the L-shaped doors, and which are provided with depending arms 8, arranged on the outer face of the transverse partition 3. The depending arms 8 of the rock-shafts are disposed on opposite sides of an oscillating bar 9, which is provided with flanges 10, arranged to engage the arms to turn the shafts to lift the doors 5 to set the trap, and the said doors are held in an elevated position by catch-bars 11, which have their outer ends pivoted to perforated lugs 12 of the doors near the angles of the latter, and which have their inner ends provided at their lower edges with shoulders 13, adapted to engage the end 14 of a lever 15. The lever 15 is fulcrumed intermediate of its ends on a central cross-piece 16, which connects the partitions 3 and 4, and its said end 14 is provided with a notch 17 and is engaged by an upper hooked end 18 of a rod 19, to the lower end of which is secured a platform 20. The platform 20 carries a bait-receptacle 21 and is arranged in an opening 22 of the base 1 and completes the latter, and is adapted to be depressed by an animal in attempting to obtain a bait from the receptacle 21. The end 23 of the lever 15 is provided with an adjustable weight 24, which counterbalances the bait-receptacle, a bait, and the bait-carrying platform, and enables the end 14 of the lever to be depressed to release the catch-bar 11 by the slightest touch. When the end 14 of the lever 15 is depressed, the catches are released and the doors 4 inclose the bait-compartment and confine an animal therein. An animal in attempting to escape after the trap is sprung passes through the communicating passage-way 6 and raises a hinged door 25, and becomes confined in the cage 2.

The setting mechanism of the trap is actuated by a weight 26, connected to one end of a cord 27, which passes over a pulley 28 and has its other end wound around a windlass 29, the shaft of which carries at its end an escapement-wheel 30, and a wheel 31, provided with a wrist-pin and connected by a bar 32 with the oscillating bar 9. The escapement-wheel 30 is provided with a winding handle 33 and with a projection 34, which engages a shoulder or stop 35 of an oscillating trip-bar 36, and the latter is provided with an inclined guide 37 to direct the projection upward past the shoulder or stop. The hinged door 25 is suspended from a rock-shaft 38, which is provided with a weighted arm 39, connected by a bar 40 with the trip-bar and adapted to hold the shoulder or stop thereof in engagement with the projection of the escapement-wheel. When the door 25, which is hinged at its top, is raised by an animal passing into the cage, the trip-bar is drawn forward, owing to the triangular shape of the weighted arm 39, which forms the bell-crank lever, and the stop or shoulder is moved out of engagement with the projection of the escapement-wheel, thereby permitting the windlass to be rotated by the weight and causing the depending arm 8 to be moved by the oscillating bar 9 and the trap to be set. Thus it will be seen that as soon as an animal touches the bait-carrying platform the trap will be sprung and the animal will be confined in the bait-chamber until it passes into the cage, and that the animal in passing into the cage resets the trap.

The bait-receptacle is a perforated box having a hinged top and adapted to contain any suitable bait, and is capable of preventing the bait being eaten by an animal trapped.

The cage is provided at its outer end with a door to enable the animals trapped to be removed.

The pulley 28 is mounted at the top of a weight-supporting frame 41, which rises from the base 1 and is arranged adjacent to the windlass.

When the trap is sprung, the free ends of the catch-bars are held by a support 42, which is arranged adjacent to the end 14 of the lever. The support 42 is provided at its top with a recess and serves as a guide to direct the catch-bars into engagement with the lever.

What I claim is—

1. In a trap, the combination, with a cage, of a bait-compartment communicating therewith, L-shaped doors arranged at opposite ends of the bait-compartment and forming the ends and top of the bait-compartment, a lever fulcrumed intermediate its ends, catch-bars pivotally connected to the doors and engaging the lever and adapted to hold the doors in an elevated position, and a bait-holder connected with the lever and adapted to depress the same to release the doors, substantially as described.

2. In a trap, the combination, with a cage, of a bait-compartment communicating therewith, L-shaped doors arranged at opposite ends of the bait-compartment and adapted to close the same, a lever fulcrumed intermediate its ends, catch-bars pivoted to the doors and engaging one end of the lever, a bait-holder connected with that end of the lever, and an adjustable weight mounted on the lever and arranged at the other end thereof, substantially as and for the purpose described.

3. In a trap, the combination of a cage, a bait-compartment communicating therewith, L-shaped doors closing the bait-compartment, rock-shafts connected with the doors and carrying the same and provided with depending arms, an oscillating bar arranged between the arms of the rock-shafts and adapted to engage the same to turn the rock-shafts, means for actuating the oscillating bar, an escapement mechanism, a lever, catches connected to the doors and adapted to engage the lever to hold the doors elevated, and a bait-holder connected with the lever and adapted to disengage the same from the catches, substantially as described.

4. In a trap, the combination of a cage, a bait-compartment communicating therewith, doors closing the bait-compartment and provided with catches, a lever fulcrumed intermediate its ends and provided at one end with adjustable weights and having its other end engaged by said catches, a rod depending from the latter end of the lever, and a bait-carrying platform attached to the lower end of the rod, substantially as described.

5. In a trap, the combination of a cage, a bait-compartment communicating therewith, doors closing the bait-compartment and provided with catches, a lever provided at one end with an adjustable weight and having its other end engaged by said catches, a bait-holder connected with the lever, rock-shafts carrying the doors and provided with depending arms, an oscillating bar arranged between the arms to move the same to lift the doors, a shaft connected with and actuating the oscillating bar, a hinged door arranged within the cage and closing the entrance of the same, escapement mechanism connected with the hinged door and the shaft and operated by the former, and means for rotating the shaft, substantially as described.

6. In a trap, the combination of a cage, a bait-compartment communicating with the same, doors closing the bait-compartment, a lever connected with the doors and holding the same open, a bait-holder connected with the lever and adapted to disengage the same from the doors to close the latter, a shaft connected with the door and adapted to reset the trap and provided at one end with a disk having a projection, a hinged door arranged in the cage and adapted to close the ends thereof, a rock-shaft carrying the hinged door and provided at one end with a weighted bell-crank lever-arm adapted to hold the hinged door closed, and a trip-bar connected with the bell-crank lever-arm and provided with a stop to engage the projection of the disk, substantially as described.

7. In a trap, the combination of a cage, a bait-compartment communicating therewith, a door closing the bait-compartment and provided with a catch, a lever arranged to be engaged by the catch, and a bait-holder connected with the lever and adapted to disengage the same from the catch, substantially as described.

DAVID WIGERT.

Witnesses:
McHenry Ruark,
Joseph C. Wigert.